March 23, 1954  C. C. FREY  2,673,262
MOTOR REVERSING MECHANISM
Filed Oct. 30, 1952  2 Sheets-Sheet 1
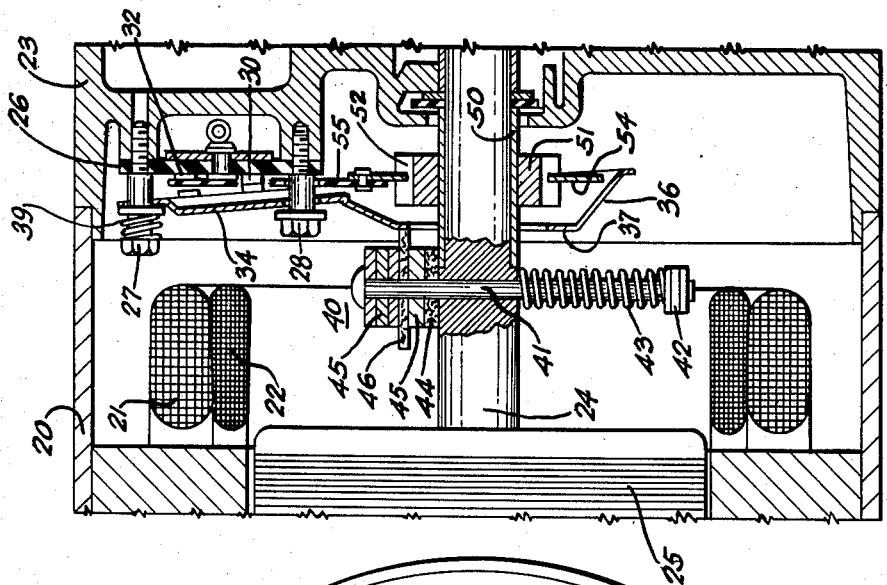
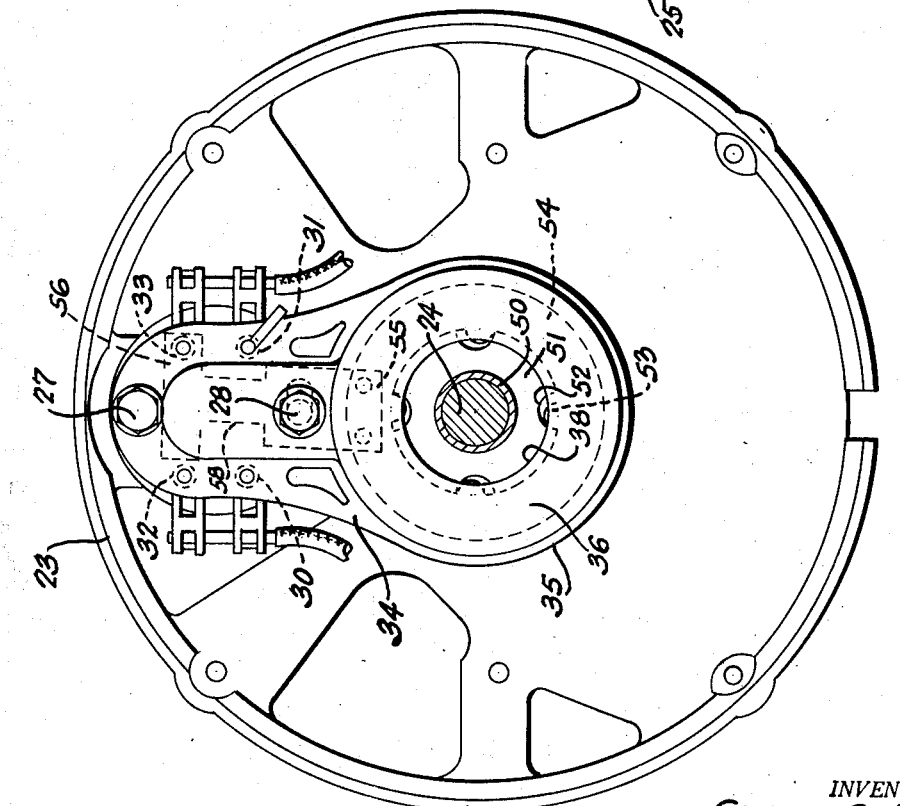
INVENTOR.
CLYDE C. FREY
BY
Willits, Hardman and Fike
his ATTORNEYS.

March 23, 1954 C. C. FREY 2,673,262
MOTOR REVERSING MECHANISM
Filed Oct. 30, 1952 2 Sheets-Sheet 2

INVENTOR.
CLYDE C. FREY
BY
his ATTORNEYS.

Patented Mar. 23, 1954

2,673,262

UNITED STATES PATENT OFFICE 2,673,262

MOTOR REVERSING MECHANISM

Clyde C. Frey, Dayton, Ohio, assignor to General Motors Corporation, Detroit, Mich., a corporation of Delaware Application October 30, 1952, Serial No. 317,669

5 Claims. (Cl. 200—80)

This invention relates to an improved electrical switch particularly of the type controlled by a centrifugal device.

The switch of the present invention is used in connection with a reversible electric motor having starting and running windings and it is among the objects of the present invention to provide a switch for facilitating the completion of circuit connections for quick reversal of motor operation.

A further object of the present invention is to provide a centrifugally controlled switch which is set at the starting of the motor in one direction for completing circuit connections to effect reversal of motor operation immediately upon the actuation of manually operated switches.

A still further object of the present invention is to provide a motor reversing switch in which wear is reduced to a minimum, this being accomplished by providing a clutch between the shaft and the switch mechanism, said clutch being effective only for a brief period while the motor is starting in the selected direction and being released when the motor is operating normally.

Further objects and advantages of the present invention will be apparent from the following description, reference being had to the accompanying drawings, wherein a preferred embodiment of the present invention is clearly shown.

In the drawings:

Fig. 1 is an end view of the interior side of the end cover member of the electric motor, showing the switch attached thereto.

Fig. 2 is a fragmentary sectional view of an electric motor equipped with the present invention.

Figures 3, 4:
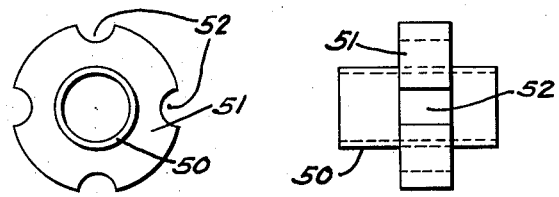
Fig. 3 is an end view of the hub of the clutch for actuating a portion of the switch for reversal purposes.
Fig. 4 is a side view of the part shown in Fig. 3.
Figure 5:
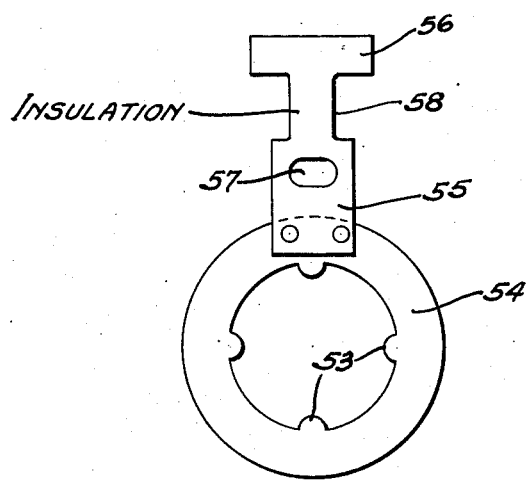
Fig. 5 is an end view of the shiftable interrupter element carried by the hub shown in Fig. 3.
Figure 6:
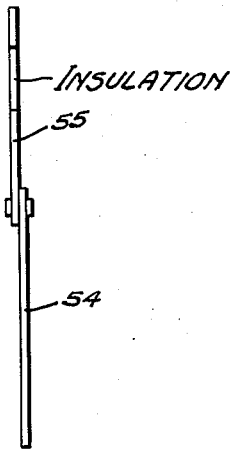
Fig. 6 is a side view of the element shown in Fig. 5.

The switch of the present invention, its electrical connections and the manner in which it operates to reverse an electric motor is similar to the switch disclosed in the copending application of Clyde C. Frey, Serial Number 271,410, filed February 13, 1952, excepting, however, that the switch interrupter of the present device differs from the interrupter shown in the application previously filed.

The primary object of the present invention is to provide a circuit control apparatus operative to effect substantially instantaneous reversal in the direction of rotation of a single phase electric motor. As shown in the drawings, the motor comprises a housing 20 in which a stator, providing the starting winding 21 and the running winding 22, is mounted. An end cover 23 fits upon one end of housing 20 and provides a bearing in which the shaft 24 of the rotor 25 is journalled. An insulating plate 26 is secured to the inside of end cover 23 by screw studs 27 and 28 which perform other functions as will be described. Plate 26 supports two pairs of stationary contacts, 30—31 and 32—33, the first pair 30—31 more adjacent screw stud 28 and the other 32—33 more adjacent screw stud 27. One or the other pair of these contacts are engageable by a tiltable bridging member 34 in the form of a metallic plate having a frustoconical formation 35 at one end which provides an annular tapering wall 36 and a flat wall portion 37 apertured at 38 to permit the shaft 24 to extend therethrough without contact therewith. Apertures in the bridging member 34 permit screw studs 27 and 28 to extend therethrough, both studs having enlarged head portions greater in transverse dimensions than the apertures in the bridging member through which the studs extend. A spring 39 surrounds stud 27 and is interposed between the bridging member 34 and the head of the stud 27 so that this spring 39 constantly exerts a force upon the member 34 to tilt it clockwise with the contact elements on said member, engaging contacts 32 and 33 acting as the pivotal points about which the member is tilted. Thus the contact elements on the bridging member 34 engageable with contacts 30 and 31 are held disengaged under these circumstances.

The centrifugal device 40, controlled by the rotation of shaft 24 in either direction, consists of a stem or pin 41 which slidably extends through a transverse opening in the shaft 24, said pin having abutment washers 42 secured at its one end. A spring 43 surrounds stem 41 and abuts against washers 42 and shaft 24 and yieldably holds the friction washer or collar 44 in engagement with the shaft 24. Besides washer 44, stem 41 supports weights 45 and a fibrous collar 46 which is larger in diameter than the weights 45 or collar 40 so that the peripheral edge of said collar 46 is constantly engaged by the surfaces 37 or 36 of the bridging member under the influence of spring 39 urging this frusto-conically shaped end of said member toward the centrifugal device, more specifically the collar 46 thereof.

The normal position of the centrifugal device or more specifically, its position when the motor is at rest, is shown in Fig. 2, where the spring 43 maintains the weighted end and particularly the friction collar 44 seated upon shaft 24. In this position collar 46 rides upon the higher, flat surface 37 of the bridging member 34 and holds said member tilted so that contacts 30 and 31 are engaged by said member and act as the pivotal points for said member, disengaging the member from the contacts 32 and 33. When the rotation of the rotor shaft 24 reaches a certain speed, the weights 45 on stem 41 will start to overcome the opposing effort of spring 43 and thus the weighted end of the stem will move outwardly and away from the shaft 24 thereby disengaging the collar 44 from the shaft. The outward movement of collar 46 radially of the shaft 24 will move the peripheral edge of said collar outwardly of the flat face 37 toward the sloping wall portion 36 of the bridging member. As the collar 46 moves outwardly, while engaging the sloping wall 36, the bridging member is gradually tilted clockwise about the pivotal contacts 30 and 31 under the constant effort of spring 39. At a predetermined speed of the rotor shaft 24, the centrifugal device will have moved to shift collar 46 outwardly so that spring 39 tilts the bridging member to engage contacts 32 and 33, and they, acting as pivotal points, will cause the tilting of member 34 to disengage contacts 30 and 31. This condition exists while the rotor shaft is operating at a predetermined R. P. M. A predetermined drop in the R. P. M. of the shaft will permit spring 43 to become effective to move the weighted end of the centrifugal device toward the shaft which causes the washer 46 to ride over the sloping surface 36 of the bridging member and actuate it tiltingly against the effort of spring 40 whereby contacts 30 and 31 are again engaged and contacts 32 and 33 disengaged by said member.

The novelty over the structure forming the subject matter of my aforeidentified application resides in the portion of the control device about to be described. In the device of the filed application, the interrupting mechanism which is operative to separate certain contacts of the device for motor reversing purposes, rides constantly upon the rotating shaft and because said mechanism itself does not rotate constantly, the frictional element engaging the shaft is subjected to constant wear during operation of the motor. In the device of the present invention, frictional engagement for actuating the interrupter by rotation of the shaft in one direction or the other is maintained temporarily and only while the centrifugal device is held against the shaft. As soon as the speed of the shaft increases sufficiently to actuate the centrifugal device, this frictional engagement is eliminated and thus while the motor is operating normally, wear due to friction is substantially reduced if not eliminated.

In the present structure, shaft 24 has a reduced diameter portion upon which a bearing sleeve 50 rides, the outer annular surface of said sleeve being substantially flush with the outer surface of the shaft. The end of the sleeve engaging the shoulder on the shaft extends beneath the friction collar 44 of the centrifugal device so that when said collar 44 is held against the shaft 24 by spring 43, it also will engage the sleeve 50 so as to secure said sleeve to the shaft and cause it to be rotated with the shaft and the centrifugal device thereon. This driving connection between the shaft 24 and sleeve 50 by collar 44 will be maintained until the rotational speed of the shaft causes the centrifugal device to move outwardly, away from the shaft against the effort of spring 43, at which time sleeve 50 will be released and shaft 24 may rotate relatively thereto.

Bearing sleeve 50 has a collar 51 attached thereto in any suitable manner, this collar being of substantial thickness and located on sleeve 50 so that the portion midway between its two flat end surfaces substantially aligns with the faces of the contacts on the insulating plate 26. Collar 51 has a plurality of notches 52 in its outer peripheral edge, which receive narrower projections 53 extending inwardly from a ring 54 of insulating material which is movable axially of the collar 51 and circumferentially relatively thereto for a distance in either direction equal to the difference in width of the notches 52 and the respective projections 53 extending into said notches. Otherwise ring 54 must rotate with the bearing 50 and its attached collar 51. A comparatively thin plate of insulating material 55 is attached to ring 54 and extends therefrom so that the cross-head portion 56 lies between and in the region of the contacts 32—33 and bridging member 34. The cross-head portion 56 is shorter from end to end than the spacing of contacts 32—33 so that said cross-head 56 may be moved to separate only one of said contacts 32 or 33 from the bridging member, depending upon which direction said plate 55 has been shifted. The elongated slot 57 in plate 55, through which the screw stud 28 extends, limits the clockwise or counterclockwise shifting of the interrupter plate 55 so that at no time the narrow neck portion 58 of plate 55 will be interposed between contacts 30—31 and the bridging member 34. When the plate 55 is shifted in one direction, so that the screw stud 28 is engaged by one end of slot 57, one end of cross-head 56 will be interposed between the bridging member 34 and one of the contacts 32—33 to prevent their engagement to close a circuit, and when said plate is shifted to cause the other end of slot 57 to engage said stud 28, the other contact will be isolated from the bridging member. In both instances, however, the contact not covered by the cross-head portion 56 of plate 55, is engageable by the bridging member for completion of a circuit.

When the centrifugal device is inactive, so that its friction collar 44 rests upon shaft 24, said collar also engages the bearing sleeve 50. As soon as the motor is energized and the shaft 24 begins to rotate, the centrifugal device 40 and especially its friction collar 44, will rotate with the shaft and consequently the bearing sleeve 50 engaged by the collar 44 will also be rotated with the shaft. If, as regards Fig. 2, this rotation is counter-clockwise, such rotation of sleeve 50 will cause a similar rotation of block 51 and its connected ring to which the insulating, interrupter plate 55 is attached, so that the cross-head portion 56 will be shifted from the position shown in dotted lines, adjacent contact 33 into contiguity with the contact 32 this shifting being limited in range by the end of the elongated slot 57 striking the screw stud 28. While the centrifugal device 40 has its collar in engagement with shaft 24 and sleeve 50, the turning effort by collar 44 on sleeve 50 will continue. However, as soon as the centrifugal device is actuated by the shaft rotating at a speed when centrifugal force overcomes the opposing effect of spring 43, collar 44 is moved out of engagement with shaft 24 and sleeve 50 and thus, during normal operation of the electric motor the shaft turns relatively to the bearing sleeve 50 thereon. This shifting action of the interrupter is comparatively sudden and the interval during which the friction collar 44 rides upon and rotates relatively to the held interrupter after it has been shifted is relatively of short duration, thereby reducing wear of collar 44 to a minimum.

Figure 7:
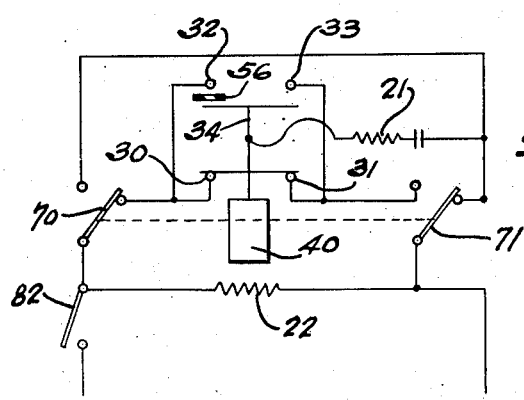
Fig. 7 is a diagrammatic view of the switching mechanism as connected to a source of power and the windings of an electric motor for effecting quick reversal of said motor.

The electrical connections for this control device are identical with the electrical connections disclosed in the afore-identified pending application, the Fig. 7 of the present drawings being a simple diagram in which a manually operable reversing switching mechanism including simultaneously actuated switches 70 and 71 are shown. In one position these switches cause current to flow in one direction through the starting winding 21 and in the other position the flow of current through said winding is reversed to effect reversal of motor operation. The running winding 22 is independent of the control device, its energization depending upon the closure of the master switch 82.

From the aforegoing description, it may be seen that applicant has provided a novel and quick acting motor reversing control mechanism in which wear has been reduced to a minimum and by means of which the operation of an electric motor may be reversed at will and without an appreciable lag or decelerating time.

While the embodiment of the present invention as herein disclosed, constitutes a preferred form, it is to be understood that other forms might be adopted.

What is claimed is as follows:

1. A circuit control device consisting of a switch movable into two circuit closing positions, a centrifugal device actuated by a rotatable shaft, said device engaging said switch and being operative when at rest or operating below a predetermined speed for actuating said switch into one of its circuit closing positions; resilient means engaging the switch and being operative to actuate said switch into its second circuit closing position when the shaft rotates the centrifugal device at and above said predetermined speed; circuit interrupting means shiftable in the switch between cooperating circuit making contacts of the switch to change the circuit making characteristics of the switch in its second circuit closing position; carrier means rotatably supported on the shaft carrying said interrupting means for shifting thereof in opposite directions as effected by opposite rotation of the shaft, and actuating means operated by said centrifugal device and engageable with said shaft and with said carrier means concurrently to effect shifting movement of said interrupting means thereby by said shaft rotation only when said device starts from its rest position.

2. A circuit control device consisting of a switch having two pairs of insulated stationary contacts and a tiltable bridging element movable into one position to engage one pair of contacts and into another position to engage the other pair of contacts; a centrifugal device mounted upon and actuated by a reversible rotatable shaft, said device, when at rest or when being rotated below a predetermined speed engaging said bridging element and maintaining it in one position of contact engagement; resilient means engaging the bridging element and urging said element into the other position of contact engagement when the centrifugal device is rotated at or above said predetermined speed; a separator shiftable between the bridging element and one or the other of said other pair of contacts for alternating the engagement of said bridging element with said other stationary contacts whereby one or the other of said other stationary contacts is engaged by said bridging element; a carrier rotatably supported upon said shaft and carrying said separator; and drive means on the centrifugal device engageable with the shaft and the carrier concurrently for drivingly connecting one to the other when said centrifugal device is at rest and releasing one from the other when said centrifugal device is actuated in response to the rotation of said shaft.

3. A circuit control device consisting of a switch having a bridging element tiltable into circuit making engagement with one or another pair of stationary contacts; a centrifugal device yieldably carried upon a reversible, rotatable shaft, said device engaging the bridging element and maintaining it in bridging engagement with one pair of contacts while the shaft is at rest or rotating below a predetermined speed; resilient means engaging the bridging element and urging it into bridging engagement with the other pair of contacts when the centrifugal device is actuated by rotation of the shaft at or above said predetermined speed; an interrupter having a sleeve member loosely supporting the interrupter on the shaft, the interrupter being shiftable between the bridging element and one or the other of the pair of contacts engageable by the bridging element under the influence of the resilient element; and friction means on the centrifugal device operative to engage the sleeve and the shaft concurrently for concurrent operation thereof only while the shaft is at rest and until the centrifugal device is actuated to disengage the friction means from the shaft and the sleeve in response to rotation of said shaft above the predetermined speed in either direction.

4. A device in accordance with claim 3 in which the interrupter consists of a thin piece of insulating material attached to the sleeve loosely mounted upon a reduced diameter portion of the shaft so that the outer diameter of the sleeve is the same as the larger diameter of the shaft, the insulating material having a cross-head portion one end of which is clear of one stationary contact and the bridging element to permit their engagement while the opposite end is interposed between and prevents engagement of the other stationary contact and the bridging element, the centrifugal device having a fibrous member engageable with both the shaft and the said sleeve for securing the sleeve to the shaft to rotate therewith while the shaft is rotating in either direction at a speed insufficient to actuate the centrifugal device.

5. A device in accordance with claim 3 in which the interrupter consists of the sleeve loosely mounted on the shaft, said sleeve having a T-shaped piece of comparatively thin insulating material attached thereto, the cross-head portion of the insulating material being shiftable in one direction or the other to separate one or the other contacts from the bridging element when moved under the influence of the resilient means, the centrifugal device having a friction collar engageable with the shaft and the sleeve to secure them together for concurrent rotation in either direction and for a limited range of movement, the centrifugal device completely releasing the sleeve when actuated by the rotating shaft to disengage the shaft, and means for limiting the range of movement of the interrupter in either direction.

CLYDE C. FREY.

References Cited in the file of this patent

UNITED STATES PATENTS

| Number | Name | Date |
| --- | --- | --- |
| 2,182,977 | Werner | Dec. 12, 1939 |
| 2,598,440 | Reek | May 27, 1952 |